United States Patent [19]

Dougherty

[11] Patent Number: 4,876,622
[45] Date of Patent: Oct. 24, 1989

[54] CIRCUIT BREAKER WARNING RELAY AND CONTROL ACCESSORY

[75] Inventor: John J. Dougherty, Avon, Conn.

[73] Assignee: General Electric Company, New York, N.Y.

[21] Appl. No.: 228,135

[22] Filed: Aug. 3, 1988

[51] Int. Cl.⁴ ............................................. H02H 3/08
[52] U.S. Cl. .................................... 361/94; 340/639; 340/661; 361/50; 361/93
[58] Field of Search ..................... 361/93, 94, 95, 96, 361/47, 48, 49, 50; 340/638, 639, 661

[56] References Cited

U.S. PATENT DOCUMENTS

| | | | |
|---|---|---|---|
| 4,385,810 | 11/1982 | Wafer et al. | 361/93 |
| 4,589,052 | 5/1986 | Dougherty | 361/94 |
| 4,652,867 | 3/1987 | Masot | 340/638 |
| 4,672,501 | 6/1987 | Bilac et al. | 361/96 |
| 4,703,387 | 10/1987 | Scott | 361/73 |
| 4,710,845 | 12/1987 | Demeyer | 361/96 |
| 4,768,025 | 8/1988 | Vila-Masot | 340/638 |
| 4,780,787 | 10/1988 | Dano et al. | 361/96 |

OTHER PUBLICATIONS

Reg. #H248, Published 4/7/87, "Fuse Status Indicator System" by Middlebrooks.

Primary Examiner—A. D. Pellinen
Assistant Examiner—Jeffrey A. Gaffin
Attorney, Agent, or Firm—Richard A. Menelly; Walter C. Bernkopf; Fred Jacob

[57] ABSTRACT

A circuit breaker warning and control relay provides visual indication of an impending overcurrent condition. Sufficient time is thereby allotted for manual intervention to prevent damage to material and equipment utilized within sensitive manufacturing processes. The relay can be arranged to automatically shut-down selected equipment in a predetermined order for load-shedding implementation.

15 Claims, 5 Drawing Sheets

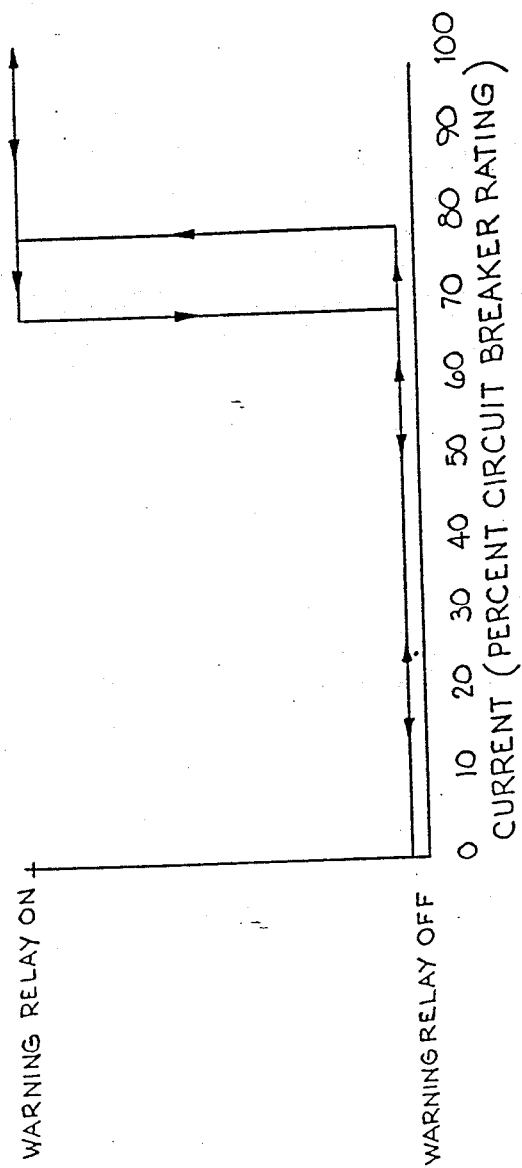

CIRCUIT BREAKER WARNING RELAY AND CONTROL ACCESSORY

BACKGROUND OF THE INVENTION

Circuit breakers having electronic signal processors for detecting the occurrence of an impending overcurrent condition are currently capable of performing auxiliary circuit protection function such as undervoltage and ground fault protection, for example. One such auxiliary function is found within U.S. Pat. No. 4,672,501 entitled "Circuit Breaker and Protective Relay Unit".

U.S. Pat. No. 4,589,052 entitled "Digital I²T Pickup, Time Bands and Timing Control Circuits for Static Trip Circuit Breakers" describes an electronic signal processor unit for determining various overcurrent conditions and interrupting a protected circuit after a predetermined time delay.

It is often helpful to provide an indication of the ON - OFF condition of a circuit breaker that is connected with industrial equipment at a location remote from the circuit breaker enclosure. One such indication is provided by means of an auxiliary switch unit whereby an indicating lamp or alarm at the location of the protected industrial equipment signals that the circuit breaker switch is in the OFF condition.

When a circuit breaker is connected within a circuit providing operating power to a sensitive manufacturing process employing robotic assembly, for example, or heat sensitive materials such as plastics, a pre-arranged shut-down procedure should be followed to prevent damage to the equipment or materials upon the occurrence of an overcurrent condition. Japanese Patent 63-031,418, published Feb. 10, 1988 describes one means for providing a warning signal upon the occurrence of a long-time overcurrent trip condition.

For purposes of this disclosure, a "long-time" overcurrent trip condition is one in which circuit interruption can be delayed for several minutes to allow the overcurrent condition to subside before interrupting a power distribution circuit. This overcurrent condition is less serious than a "short-circuit" condition which requires an immediate interruption of the circuit or a "short-time" condition which requires interruption within a few minutes to prevent damage to equipment used within the protected circuit as well as damage to the conductors within the protected circuit itself.

The present invention proposes to provide an immediate indication to an operator of a manufacturing process involving sensitive manufacturing equipment or materials that a long-time overcurrent condition is impending to thereby allow the operator to shut-down the equipment in a pre-arranged order to protect such equipment and materials. Alternatively, the invention proposes the implementation of an automatic shut-down procedure to turn off the equipment in a predetermined order upon the early indication of an impending long-time overcurrent condition or to control electricity usage for energy management purposes.

SUMMARY OF THE INVENTION

An automatic circuit interruption device employing an electronic overcurrent signal processor unit is provided with an auxiliary indicating and control circuit for sensing the occurrence of a long-time overcurrent condition and for providing indication thereof by means of an audial alarm or a visual display. One such visual display comprises a light-emitting diode in combination with a solid state warning relay for both indicating the occurrence of the long-term overcurrent condition and for performing automated shut-down of industrial equipment in a predetermined order.

BRIEF DESCRIPTION OF THE DRAWINGS

FIG. 5 is a graphical representation of the ON - OFF time hysteresis designed for the indicating and control circuit according to the invention.

DESCRIPTION OF THE PREFERRED EMBODIMENT

Figure 1:
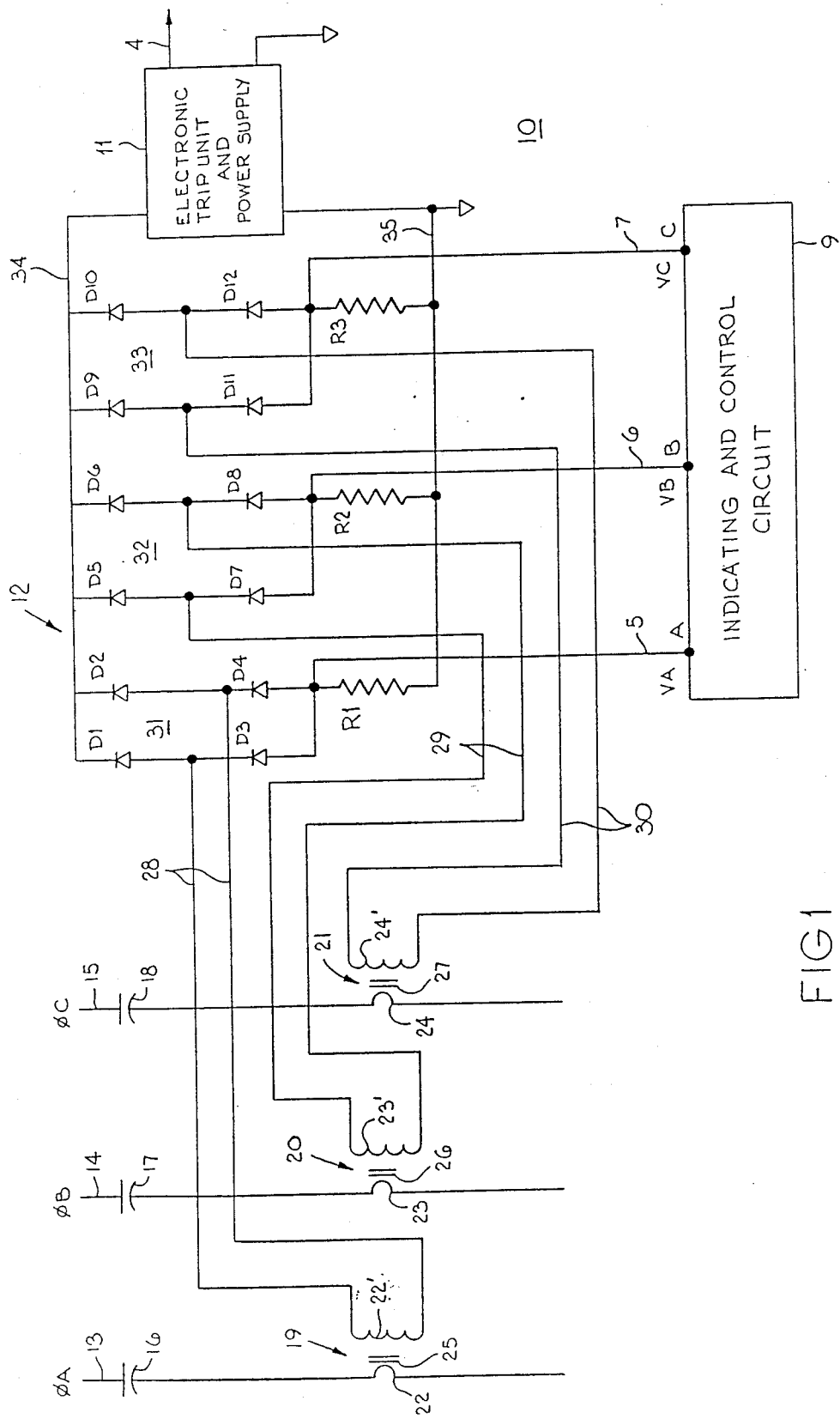
FIG. 1 is a diagrammatic representation of a circuit interrupter including an electronic trip unit, a sensing circuit and an indicating and control circuit connected with the three-phases of a protected power system according to the invention.

Before describing the indicating and control circuit of the invention, it is helpful to review the operation of a circuit interrupter 10 such as depicted in FIG. 1. An electronic trip unit and power supply 11, such as that described within aforementioned U.S. Pat. No. 4,589,052, is electrically connected through a sensing circuit 12 with the separate phases of a three-phase power distribution circuit consisting of conductors 13-15 each of which contain a pair of separable contacts as generally indicated at 16-18, respectively. Three corresponding current transformers 19-21 are arranged for sensing the current through the individual phases by means of a primary winding 22-24 which current is reflected through transformer cores 25-27 and secondary windings 22'-24' to the sensing circuit via wire conductor pairs 28, 29 and 30, as indicated. The sensing circuit 12 includes three bridge rectifiers 31, 32, 33 consisting of diodes $D_1$-$D_{12}$ and three corresponding burden resistors $R_1$-$R_3$. The equivalent voltage value for each phase of the phase conductors 13-15 obtained across the burden resistors is transmitted to the electronic trip unit and power supply 11 over conductors 34, 35 as well as to an indicating and control circuit 9 over conductors 5-7. This voltage information is processed within the electronic trip unit and a decision is reached with respect to a circuit interruption function therein. The indicating and control circuit provides a visual indication of the occurrence of a long-time overcurrent condition as well as supplying output signals for controlling the shut-down sequence of loads electrically connected with the phase conductors.

Figure 2:
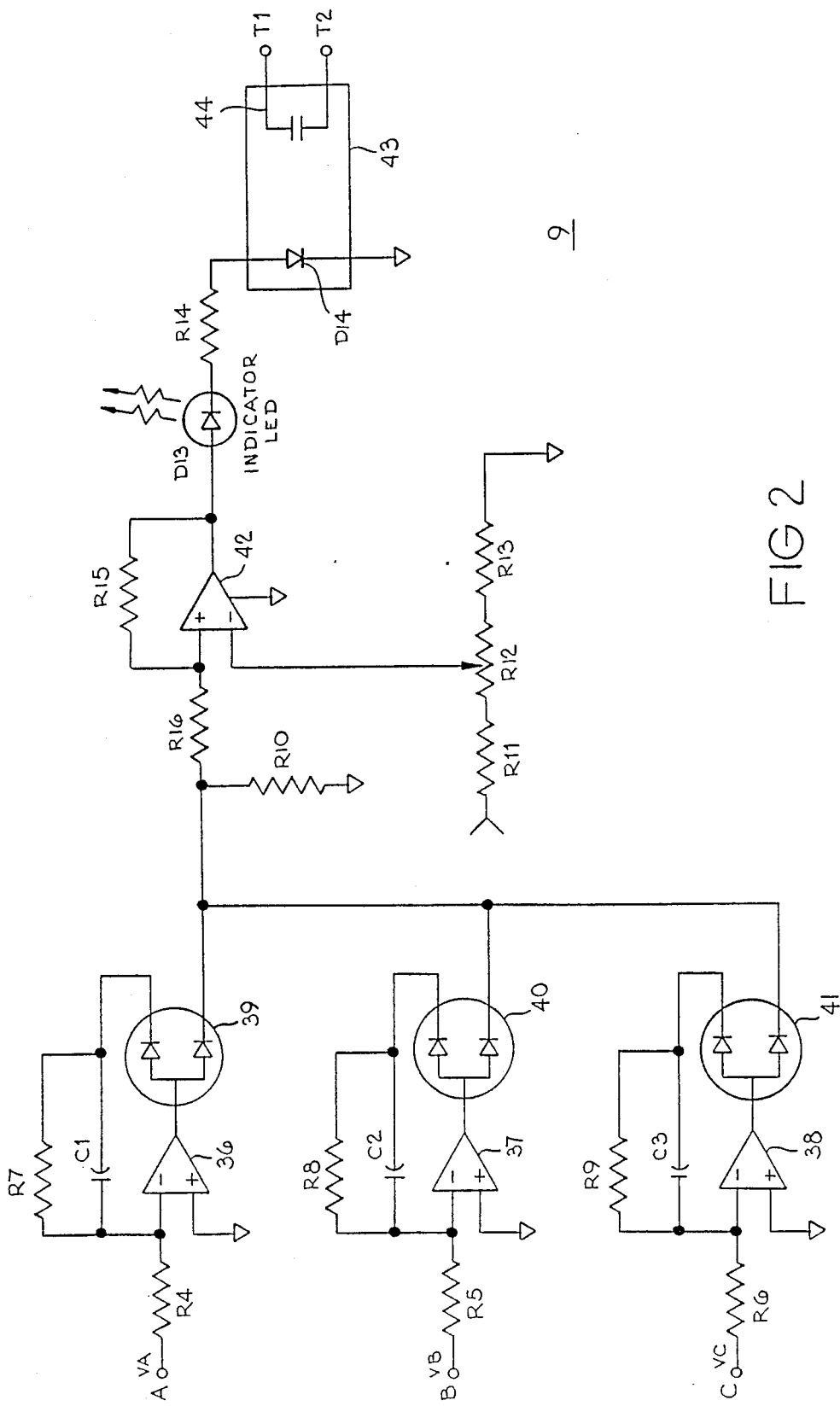
FIG. 2 is a diagrammatic representation of the indicating and control circuit used with the circuit interrupter of FIG. 1.

The indicating and control circuit 9 is depicted in FIG. 2 and is described as follows. The input terminals A-C receive the maximum representation of the individual phase currents and compares the maximum against a user adjustable reference within three inverting, operational amplifiers 36-38. The signal voltage obtained from the sensing circuit for each phase, is applied to the amplifiers through dropping resistors $R_4$-$R_6$ and to the double-diodes 39-41 connected respectively to the outputs of the operational amplifiers through feedback resistors $R_7$-$R_9$. The double-diodes are type BAW 56 switching diodes obtained from Siemens. Capacitors $C_1$-$C_3$ are used to filter out any extraneous AC signals. The three-phase voltage signals supplied to the inputs of the amplifiers are compared within the double-diodes and the maximum phase signal voltage appears across a single resistor $R_{10}$. The double-diodes are matched pairs which serve to both compare the maximum voltage and, by placing half of the diodes in the feedback loop, do not affect the incoming voltage. The value of $R_{10}$ is selected to be equal to the individual resistors $R_7$-$R_9$ in order that all the currents through the double-diodes will be balanced. The voltage value appearing across $R_{10}$ is applied to one input of a fourth amplifier 42, connected as a comparator, through resistor $R_{16}$ wherein it is compared to a reference voltage value appearing across the resistance bridge consisting of resistors $R_{11}$-$R_{13}$ which is connected to the other input of the fourth amplifier. The resistor $R_{15}$ performs a positive feedback function to stabilize the comparator by adding hysteresis. The hysteresis determines the time lag between the "ON" and "OFF" states of the amplifier and hence of the relay itself. The fourth amplifier is adjusted such that the reference voltage applied to the negative input can be set from approximately seventy percent to ninety percent of the circuit breaker current rating. When the maximum phase voltage signal exceeds the reference, the amplifier turns on the indicator LED $D_{13}$ to provide visual indication that a predetermined long-time overcurrent condition has occurred. The indicator LED is connected through a resistor $R_{14}$ to a solid state relay 43 which includes a second LED $D_{14}$ and a pair of photo-contacts 44. When the second light-emitting diode becomes transmissive, the photo-contacts respond to thereby provide an isolated, conductive path between terminals T1, T2. When the circuit interrupter 10 of FIG. 1 is used with sensitive manufacturing equipment, of the type described earlier, a plurality of such solid state relays can be arranged to selectively shut-down the equipment in a predetermined manner. The arrangement of such a plurality of solid state switches performs a "load-shedding" function whereby selected equipment is shut-down while the rest of the equipment remains operational until the overcurrent condition ceases or until the electronic trip unit times out the long-time overcurrent condition and provides a trip signal over conductor 4 to open the contacts 16-18 (FIG. 1).

In load-shedding applications, the selection of the hysteresis value that determines the time lag between the "ON" and "OFF" states of the warning relay is critical. Hysteresis is normally used in amplifier circuits to stabilize operation and prevent oscillation. As the amplifier inputs approach a state change, a small amount of such positive feedback ensures that the state change takes place. Normally, the amount of hysteresis is small, less than 1%, and the amplifier essentially changes state at the same value in both directions, that is, "high" to "low" or "low" to "high". When used to implement an energy management function directly, system hysteresis, rather than amplifier hysteresis is important. If the warning relay hysteresis were equivalent to only 1% of the circuit breaker rating, a change in load of more than 1% at the switch point will cause the realy to change state. When the warning relay operates at 70%, for example, removal of any load greater than 1% will cause the relay to change state again. The result will be rapid ON - OFF cycling of the load, which presents an unstable system condition. By setting the hysteresis in the warning relay to a much higher value, such as 10%, a sizable load can be removed without the relay changing state until the remaining load reduces in value. This is accomplished by selecting the proper value of the resistor $R_{15}$ of the amplifier 42. At the same time, the actual load on the protected circuit can be reduced by nearly 10% or the amount of the hysteresis. FIG. 5 shows the system effect of hysteresis for an 80% warning setpoint and a 10% hysteresis. The arrows indicate the direction of operation in each region. In the range between 70% and 80% of current rating, the relay switch point is controlled by the circuit breaker current without hysteresis as indicated by the unidirectional arrows.

Figure 3:
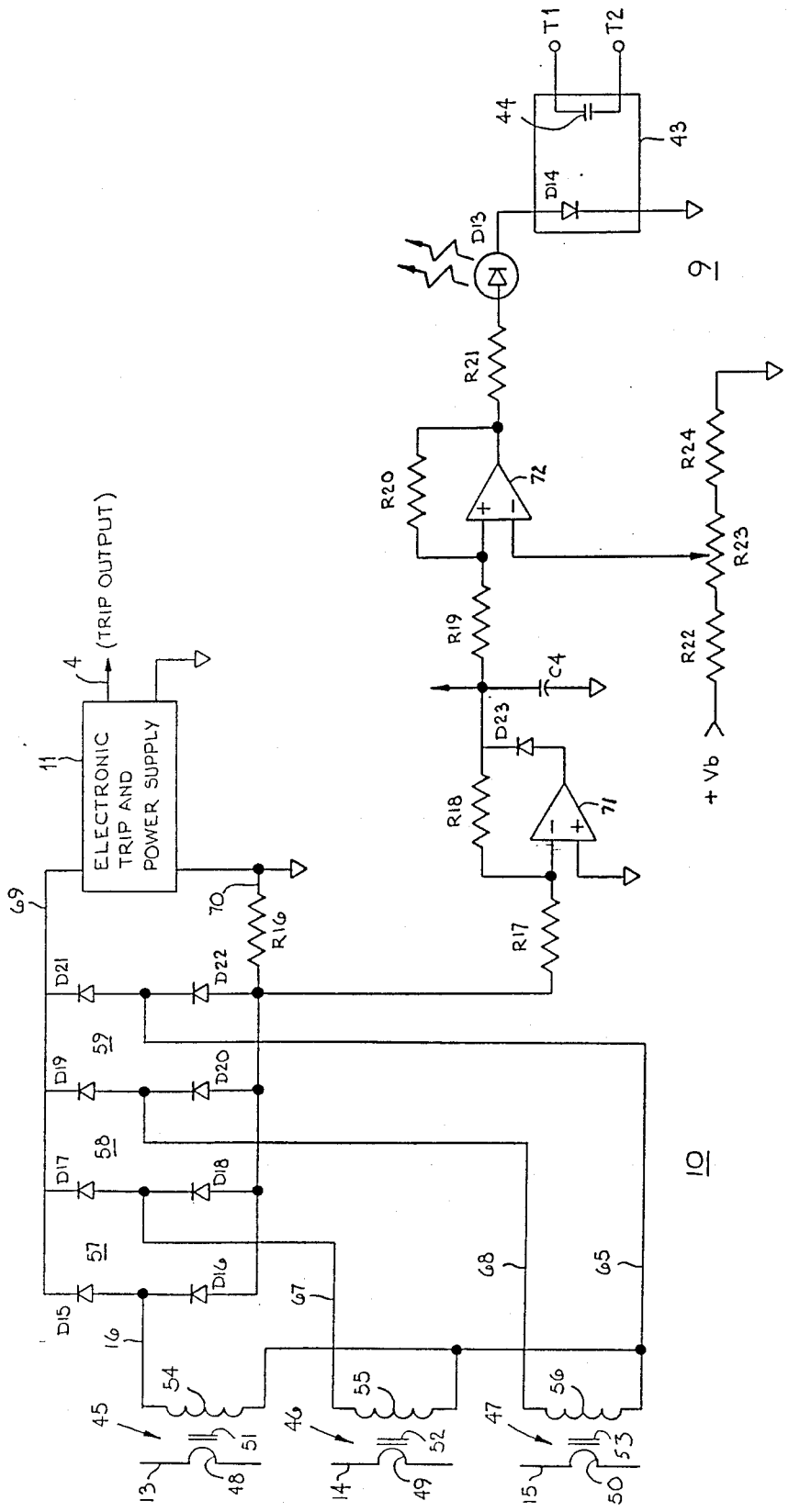
FIG. 3 is a diagrammatic representation of a circuit interrupter containing the indicating and control circuit of FIG. 2 with an alternate sensing circuit.

The circuit interrupter 10 of FIG. 3 operates in a manner similar to that of FIG. 1. In this arrangement, however, "peak" current is sensed across a single burden resistor $R_{16}$ rather than across a separate burden resistor for each phase such as resistors $R_1$-$R_3$ in FIG. 1. Still referring to FIG. 3, the current through the phase conductors 13, 14, 15 is sensed by means of current transformers 45, 46, 47 each of which includes a primary winding (48-50), a secondary winding (54-56) and a core (51-53). One side of each of the secondary windings is connected in common to a conductor 65 while the other side of the secondary windings is connected by means of conductors 67-68 to bridge rectifiers 57, 58, 59 consisting of diodes $D_{15}$-$D_{22}$. The output of the rectifiers is applied to burden resistor $R_{16}$ and to the input of the electronic trip unit and power supply 11 over conductors 69, 70 which provides a trip output signal over conductor 4 in the manner described earlier with reference to FIG. 1. The voltage signal appearing across the burden resistor $R_{16}$ is applied to the negative input of an inverting amplifier 71 through resistor $R_{17}$. The negative input of the amplifier is connected to the output in a feedback loop consisting of feedback resistor $R_{18}$ and diode $D_{23}$. The operation of the amplifier is similar to that of amplifiers 36-38 shown earlier in FIG. 2. The output of the amplifier is peak-detected by capacitor $C_4$ and applied through resistor $R_{19}$ to the positive input of a comparator 72 which includes a resistor $R_{20}$ as a positive feedback for hysteresis. This combination creates a track-and-hold amplifier. A resistor bridge consisting of resistors $R_{22}$-$R_{24}$ supplies a reference voltage to the negative input of the amplifier which is adjustable from approximately seventy percent to 100% of the circuit breaker current rating. When the reference voltage is exceeded, a voltage signal appears at the output of the second amplifier and is applied through a step-down resistor $R_{21}$ to a light-eemitting diode $D_{13}$ to give an indication that the electronic trip unit 11 is beginning to time out a long-time overcurrent condition. As described earlier, a solid state relay 43 consisting of a light-emitting diode $D_{14}$ and photo-contacts 44 are used to provide electrical continuity between terminals T1, T2 to allow for selective switching between the electrical loads connected within the protected circuit.

Figure 4:
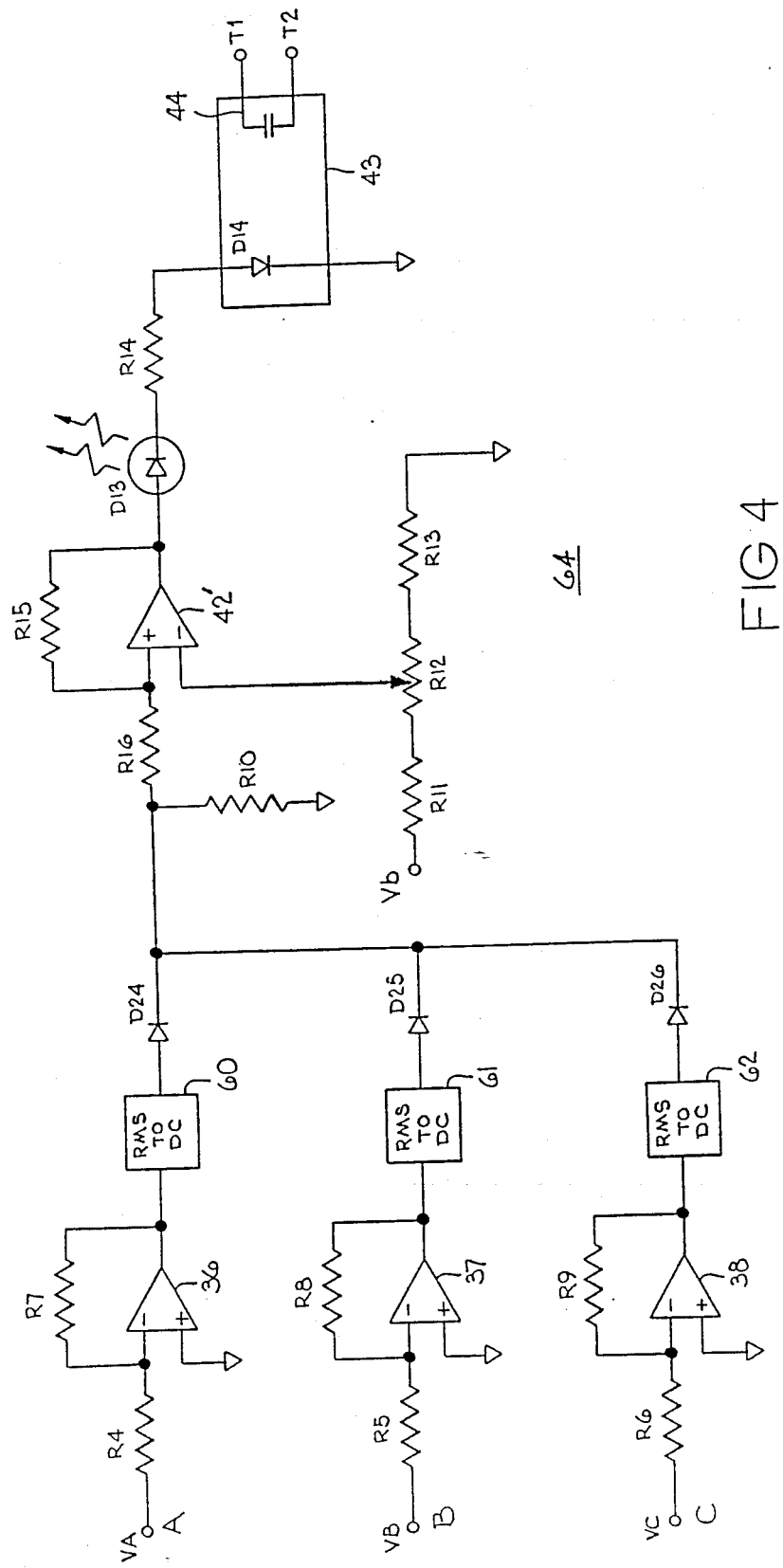
FIG. 4 is a diagrammatic representation of an alternate indicating and control circuit according to the invention.

FIG. 4 depicts an alternative sensing circuit 64 similar in several respects to that described earlier with reference to FIG. 2. The voltage representation VA-VC of the individual phase conductors 13, 14, 15 of FIG. 1 is applied to terminals A, B, C and from there through dropping resistors $R_4$-$R_6$ to similar amplifiers 36-38 which contain similar resistors $R_7$-$R_9$ in a feed-back loop arrangement. The double-diodes 39–41 of FIG. 2 are replaced by RMS-to-DC converters 60–62 and diodes $D_{24}$–$D_{26}$ which connect to the input of a special amplifier 42'. One such RMS-to-DC device is an AD5-36A sold by Analog Devices, Inc. The burden resistor $R_{10}$ is connected to the positive input of the amplifier 42'. A similar resistance bridge consisting of resistors $R_{11}$–$R_{13}$ is connected to the negative input terminal to set the reference value. The light-emitting diode $D_{13}$ connected to the output of the amplifier connects to the solid state relay 43 through resistor $R_{14}$. The light-emitting diode $D_{14}$ responds in a similar manner to close the photo-contacts 44 and thereby allows current transfer between terminals T1, T2 to operate the selected loads as described earlier with reference to FIG. 2.

An inexpensive indicating and control circuit has herein been described for application with electronic type circuit interruption devices. Both RMS and peak sensing circuits can be employed to indicate to an operator the occurrence of a long-time pick-up and can automatically institute the shut-down of selected equipment in a predetermined manner.

Having thus described my invention, what I claim as new and desire to secure by Letters Patent is:

1. A circuit breaker warning relay and indicator circuit comprising:
   a plurality of input terminals;
   a corresponding plurality of first operational amplifiers connected with said input terminals;
   a corresponding plurality of double-diodes connected with outputs from said first operational amplifiers;
   said double-diodes having first outputs connected in parallel with each other and in series with one input to a second operational amplifier having ON and OFF states, another input to said second operational amplifier being connected with a reference voltage; and
   an indicator diode connected to an output from said second operational amplifier for providing indication of the ON state of said second operational amplifier.

2. The circuit breaker warning relay and indicator circuit of claim 1 including a photo-responsive relay connected with said indicator diode to electrically disconnect an associated load.

3. The circuit breaker warning relay and indicator circuit of claim 1 wherein each of said double-diodes includes a pair of linear diodes having their anodes connected in common and one of their cathodes connected to an input to one of said first operational amplifiers.

4. The circuit breaker warning relay and indicator circuit of claim 1 wherein said one input to said second operational amplifier is connected with an output from said second operational amplifier through a feedback resistor.

5. The circuit breaker warning relay and indicator circuit of claim 1 wherein said first operational amplifiers are connected to said input terminals through a corresponding plurality of dropping resistors.

6. A circuit breaker warning relay and indicator circuit comprising:
   a first operational amplifier having an input connected with an input terminal through a dropping resistor;
   a second operational amplifier having one input connected to an output from said first operational amplifier through a diode and a resistor, and having another input connected to a predetermined reference voltage; and
   an indicating diode connected to said second operational amplifier output to indicate ON and OFF states of said second operational amplifier.

7. The circuit breaker warning relay and indicator circuit of claim 6 including a photo-responsive relay connected to said indicating diode for electrically disconnecting an associated load.

8. A circuit breaker warning relay and control circuit comprising:
   a plurality of input terminals;
   a corresponding plurality of first operational amplifiers having inputs connected with said input terminals, each of said first operational amplifiers having an output connected to an RMS to DC converter;
   a corresponding plurality of diodes having their anodes connected to said RMS to DC converters and their cathodes connected in common; and
   a second operational amplifier having one input connected with said common diode connection and an output connected with an indicating diode to indicate ON and OFF states of said second operational amplifier.

9. The circuit breaker warning relay and control circuit of claim 8 wherein another input to said second operational amplifier is connected to a predetermined reference voltage and wherein said one input is connected to said output through a feedback resistor having a predetermined value to provide a predetermined hysteresis to said second operational amplifier.

10. The circuit breaker warning relay and control circuit of claim 9 including a photo-responsive relay connected to said indicating diode for electrically disconnecting an associated load.

11. A circuit breaker and warning relay device comprising in combination;
    a plurality of separable contacts;
    a corresponding plurality of current transformers associated with said contacts for determining the magnitude of current transferring through said contacts;
    a corresponding plurality of diode rectifiers and burden resistors connected with said current transformers for generating a plurality of voltage signals representative of said current through said contacts;
    an electronic trip unit connected with said burden resistors for processing said voltage signals and operating to separate said contacts upon occurrence of a current through said contacts in excess of a predetermined magnitude for a predetermined time increment; and
    an indicating and control circuit connected with said burden resistors, and including a plurality of first operational amplifiers connected with a corresponding plurality of double-diodes, said double-diodes being connected in common with each other and to one input to a second operational amplifier, an output from said second operational amplifier being connected to a photo-responsive relay through an indicating diode, a second input to said second operational amplifier being connected to a predetermined reference voltage to set the hysteresis of ON and OFF states of said second operational amplifier to a corresponding predetermined time.

12. The circuit breaker and warning relay device of claim 11 wherein said ON and OFF state hysteresis is equal to or greater than a predetermined percentage of rated current through said contacts.

13. A circuit breaker and warning relay device comprising in combination;

a plurality of separable contacts;

a corresponding plurality of current transformers associated with said contacts for determining the magnitude of current transferring through said contacts;

a corresponding plurality of diode rectifiers and burden resistors connected with said current transformers for generating voltage signals representative of said current through said contacts;

an electronic trip unit connected with said burden resistors for processing said voltage signals and operating to separate said contacts upon occurrence of a current through said contacts in excess of a predetermined magnitude and in excess of a predetermined time;

an indicating and control circuit connected with said burden resistors and including a plurality of first operational amplifiers connected with a corresponding plurality of RMS to DC converters, the outputs of said converters being connected in common through corresponding diodes; and a second operational amplifier having ON - OFF states hysteresis, said second operational amplifier having one input connected to said common connected diodes, an output from said second operational amplifier being connected to a photo-responsive relay through an indicating diode, a second input to said second operational amplifier being connected to a predetermined reference voltage to set the ON - OFF states hysteresis of said second operational amplifier to a corresponding predetermined time.

14. The circuit breaker and warning relay device of claim 13 wherein said ON-OFF states hysteresis is equal to or greater than a predetermined percentage of rated current through said contacts.

15. A circuit breaker and warning relay comprising in combination;

a plurality of separable contacts;

a corresponding plurality of current transformers and bridge rectifiers associated with said contacts to determine circuit current through said contacts;

a burden resistor connected with said rectifiers to generate a voltage signal representative of said circuit current;

an electronic trip unit connected with said burden resistor for separting said contacts when said circuit current exceeds a predetermined value for a predetermined time;

a first operational amplifier having an input connected with said burden resistor and an output connected to one input to a second operational amplifier said second operational amplifier having ON - OFF states hysteresis, a second input to said second operational amplifier being connected to a predetermined reference voltage to set the ON and OFF states hysteresis of said second operational amplifier to a corresponding predetermined time; and a photo-responsive relay connected to said second amplifier output through an indicating diode, said photo-responsive relay being arranged to electrically disconnect an associated load.

* * * * *